United States Patent [19]

Suzuki

[11] 4,220,428

[45] Sep. 2, 1980

[54] TOOL HOLDER

[75] Inventor: Masakazu Suzuki, Sowa, Japan

[73] Assignee: Suzuki Iron Works Co., Ltd., Ibaragi, Japan

[21] Appl. No.: 915,775

[22] Filed: Jun. 15, 1978

[30] Foreign Application Priority Data

Jun. 18, 1977 [JP] Japan .................................. 52-72531

[51] Int. Cl.³ ............................................. B26D 1/00
[52] U.S. Cl. .................................... 407/105; 407/82; 407/89
[58] Field of Search ................... 407/89, 82, 105, 83, 407/84, 48

[56] References Cited

U.S. PATENT DOCUMENTS

| 3,491,421 | 1/1970 | Holloway | 407/105 |
| 3,683,473 | 8/1972 | Joynson | 407/105 |
| 3,885,282 | 5/1975 | Pataky | 407/89 |
| 4,057,884 | 11/1977 | Suzuki | 407/89 |

Primary Examiner—Leonidas Vlachos
Attorney, Agent, or Firm—Wenderoth, Lind & Ponack

[57] ABSTRACT

A tool holder having a cut-out portion in its forward end which is to defined as a generally flat surface for supporting the bottom surface of a tool bit over the entire area of the flat surface and an upstanding side wall for engaging a substantial portion of the side surface of the tool bit. A retaining pin is rockingly mounted on the tool holder with the upper end projecting out of the flat surface and being received of a hole of the tool bit. The lower end portion of the retaining pin is urged laterally with respect to the longitudinal axis of the pin by a tightening screw whereby the tool bit is urged against the upstanding side wall.

3 Claims, 5 Drawing Figures

TOOL HOLDER

BACKGROUND OF THE INVENTION

This invention relates to a tool holder for supporting and holding a tool bit or a tip formed of hard material such as cemented carbide or the like for use in cutting operations.

Various types of tool holders have been proposed for supporting and holding the tool bit thereon. Tool holders using clamping screws for clamping the tool bits directly on the tool holders or through clamping members are well known to those skilled in the art as shown for example, in Japanese Utility Model Publications 191/1964 and 1687/1964.

However, clamping bolts and/or clamping members projecting on the upper side of tool bits prevent smooth movement of the cutting chips.

A clamping screw having a countersunk head has also been used to clamp the tool bit into the tool holder but it becomes necessary to form a correspondingly countersunk bore in the tool bit thus impairing the versatility of the tool bit and increasing manufacturing cost.

SUMMARY OF THE INVENTION

An object of the present invention is to provide a tool holder which enables one to easily and reliably clamp a tool bit of standard type and having a cylindrical hole therein into the tool holder.

According to the present invention, a cut-out portion or a recess having an upstanding side wall and a generally flat bottom surface is formed in the forward end of a tool holder. A tool bit is received in the cut-out portion with a substantial portion of the side surface of the tool bit contacting the upstanding side wall and the lower surface of the tool bit is in contact with the flat surface over the entire area thereof. A retaining pin is mounted on the tool holder and can be rocked in a direction lateral to the longitudinal axis of the pin. The upper end of the pin projects out of the flat surface and engages with the cylindrical hole of the tool bit and the lower end portion of the pin is urged in the lateral direction with respect to the longitudinal axis of the pin or in the sideward direction by suitable means such as a tightening which is screw-threadingly received in its tool holder with the inner end portion thereof engaging the lower end portion of the retaining pin. This interaction urges the tool bit against the upstanding side wall of the cut-out portion.

The construction of the tool holder is very simple and the mounting or demounting operation can be performed very easily and, furthermore, there are no members projecting out of the tool holder thereby eliminating any interference caused by projecting members.

The direction of the rocking movement of the retaining pin can be easily controlled and thus the tool bit can be reliably mounted on the tool holder.

BRIEF DESCRIPTION OF THE DRAWINGS

The foregoing and other objects and advantages of the present invention will be readily apparent for to those skilled in the art from the following description taken together with the accompanying drawings, in which.

DETAILED DESCRIPTION OF THE PREFERRED EMBODIMENT

Figure 1:
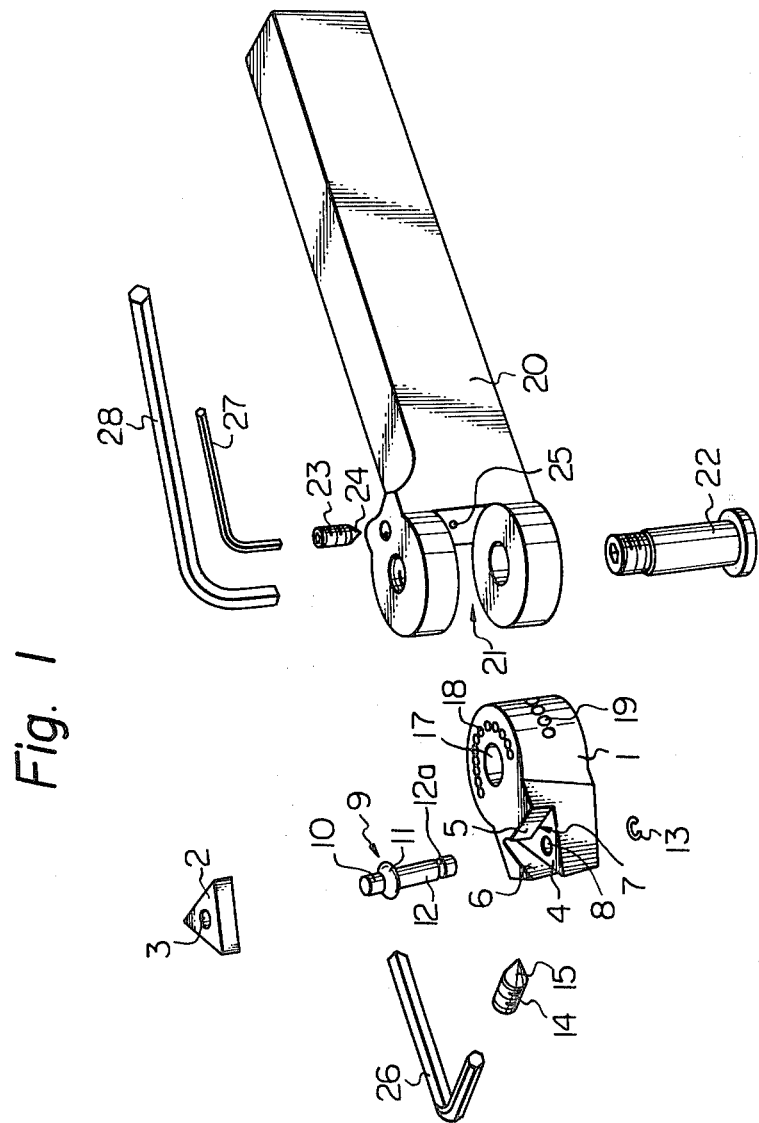
FIG. 1 is a perspective exploded view showing a tool holder of the present invention.

The tool holders shown in the drawings are generally similar to those shown in U.S. Pat. No. 4,057,884, and comprise a tool bit supporting member 1 supporting a tool bit 2 thereon and adjustably secured to an elongated shank 20.

The tool bit supporting member 1 includes a generally cylindrical body portion and a tool bit supporting portion projecting from the side surface of the body portion. A cutout portion defining a recess 7 is formed in the upper surface of the tool bit supporting portion and has a generally flat lower surface 4 and upstanding side walls 5 and 6 for receiving a triangular tool bit 2 which has a cylindrical hole 3 therethrough. The size of the surface 4 is approximately equal to that of the tool bit 2 and when the tool bit 2 is received in the recess 7 two of the three side surfaces of the tool bit 2 contact the upstanding walls 5 and 6 respectively.

The tool bit 2 is preferably formed of hard material such as cemented carbide, stellite or the like.

The body portion of the tool holder has a bore 17, a series of indexing recesses 18 on the upper surface thereof and a series of indexing recesses 19 on the cylindrical side surfaces thereof. The tool bit supporting member 1 is received in a recess 21 formed in the forward end of the shank 20. The recess 21 is located between vertically spaced limbs of the shank 20 having opposing flat surfaces respectively and an arcuate side surface. The opposing flat surfaces are adapted to slidably engage the upper and lower surfaces of the tool bit supporting member 1. A tightening bolt 22 extends through the bore 17 of the tool bit supporting member 1 and threadingly engages with a threaded bore of the upper limb for securing the tool bit supporting member 1 in position between the upper and lower limbs.

The diameter of the bore 17 of the tool bit supporting member 1 is substantially equal to that of the shank portion of the bolt 22. Preferably, a bore formed in the lower limb has a diameter substantially equal to that of the bore 17, and the bore is counterbored from the bottom (not shown) for receiving the head portion of the bolt 22, so that the head portion of the bolt does not project from the lower surface of the tool holder thereby increasing the various uses of the tool holder by eliminating another possible projecting portion. Shown at 28 is a tool for tightening or loosening the bolt 22.

When the bolt 22 is not tightened, the tool bit supporting member 1 can rotate around the bolt 22 and therefore the tool bit 2 secured on the tool bit supporting member 1 can be located at a desired angular position relative to the horizontal direction of the shank 20 and, thus, the tool holder can be used as either a right-handed tool or a left-handed tool as desired.

For fixing the angular position of the tool bit 2 or the tool bit supporting member 1 relative to the shank 20, there is provided indexing means including the angularly spaced recesses 18 formed in the upper surface of the tool bit supporting member 1, and a position adjusting and fixing screw 23 threadingly engaged with the upper limb of the shank 20 for selectively engaging one of the recesses 18 with a generally conical tip end 24.

For facilitating the indexing operation when using the adjusting and fixing screw 23 and the recesses 18, the recesses 19 formed in the cylindrical side surface of the tool bit supporting member 1 cooperate with a ball 25 retained in a blind bore (not shown) formed in the arcuate vertical wall of the recess 21 of the shank 20 which projects outward by a small distance from the surface of the wall. The location of the recesses 18 and 19 is such that when one of the recesses 19 is engaged by the ball 25, one of the recesses 18 is roughly aligned with the adjusting and fixing screw 23, thereby avoiding a failure of the cone shaped tip end 24 of the screw 23 to engage one of the recesses 18.

In the embodiment shown in the drawing, the recesses 18 (and accordingly the recesses 19) are spaced from each other by an angle of 15° over a total range of 180°.

Figure 2:
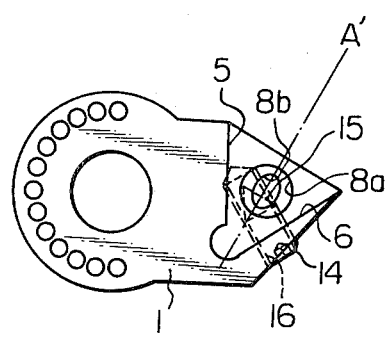
FIG. 2 is a plan view of the tool bit supporting member of the tool holder of FIG. 1.
Figure 3:
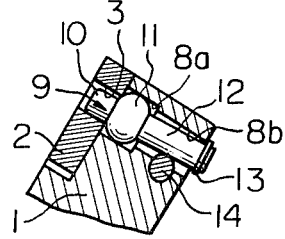
FIG. 3 is a cross-sectional view of the essential portion of the tool holder of FIG. 1, and taken along line A' in FIG. 2.

The tool bit 2 is mounted on the tool bit supporting member 1 by a novel pin 9 which is described as follows. As shown in FIGS. 1 and 3, the pin 9 include a head portion 10 for engaging the cylindrical bore 3 of the tool bit 2, a large diameter portion 11 contiguous to the head portion 10 and preferably has a convex outer surface of a spherical or ellipsoidal shape and a stem portion 12 which extends downward from the large diameter portion 11. An annular groove 12a is formed in the lower end of the stem portion 12 to receive a retaining ring 13. A pin receiving bore 8 is formed in the tool bit supporting member 1 for receiving the large diameter portion 11 and the stem portion 12 of the pin 9 therein. The bore 8 has a large cylindrical portion 8a for receiving the large diameter portion 11 of the pin 9 therein, and a generally oval shaped bore portion 8b for receiving the stem portion 12 of the pin 8 therein. The bore portion 8b allows a rocking movement of the stem portion 12 in the lateral direction or more particularly in the direction along the chain line A' shown in FIG. 2. Thus the pin 9 received in the bore 8 and can rockingly move about the outer surface large diameter portion 11 which is received in the large cylindrical bore portion in the plane including the chain line A' as seen in FIG. 2 or in the plane of the paper as seen in line 3. A tightening screw 14 having a generally conical inner end 15 threadingly engages a threaded hole 16 located in the tool bit supporting member 1. The inner end 15 of the screw 14 engages the side surface of the stem portion 12 of the pin 9 thereby displacing the stem portion 12 toward the letter A' along the chain line A' as seen in FIG. 2, so that the head portion 10 of the pin 9 presses the tool bit 2 in the opposite direction and, accordingly, against the upstanding walls 5 and 6. Preferably, the shape of the conical angle of the conical shaped end 15 of the tightening screw 14 and the orientation of the threaded hole 16 are determined so that the end 15 of the screw 14 defines a line generally perpendicular to the chain line A' as shown in FIG. 2.

Preferably, the large diameter portion 8b of the bore 8 is formed to have an oval, elliptical or elongated circular cross-section with its longer axis beng located generally along the line A' as shown in FIG. 2. However, the bore portion 8b may have a circular cross-section with a relatively large diameter so that the pin 9 can rockingly move in any desired direction, although in use, the direction of the rocking movement of the pin 9 is controlled by the inner end 15 of the tightening screw 14. The retaining ring 13 which engages the annular groove 12a of the pin 9 retains the pin 9 in the bore 8.

Figure 4:
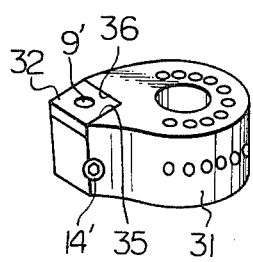
FIG. 4 is a perspective view of a modified form of the tool bit and the tool bit supporting member of FIG. 1.
Figure 5:
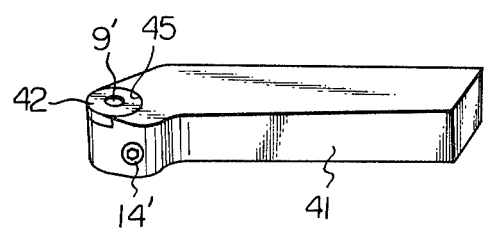
FIG. 5 is a perspective view of another modified form of the tool bit and the tool holder of FIG. 1.

The tool bit 2 shown in FIGS. 1 and 3 has the shape of a triangle, but as shown in FIGS. 4 and 5, the tool bit may have the shape of a square or a circle, or any other shape as required.

In FIG. 5, the circular shaped tool bit 42 is supported on an integral tool holder or shank 41 by means of a pin 9' according to the present invention, and the tool bit 42 is pressed against wall 45 by a tightening pin 14'.

The tool holder of the present invention as heretofore described can be used as a right-handed tool (FIGS. 1 and 2) as well as a left-handed tool (FIGS. 4 and 5). The tool holder can be simply manufactured and has sufficient strength and rigidity, without having any parts projecting out of the upper surface of the tool holder and thereby thus eliminates any interference caused by projecting chips.

Further as described previously, a counterbore (not shown) may be formed in the lower end of the bore portion 8b to receive the retaining ring 13 and the lower end of the pin 9, whereby it is possible to eliminate all parts projecting out of the underside surface of the tool holder thereby allowing easy installation of the tool holder on a tool carriage.

Finally, it is very easy to mount or remove the tool bit on or from the tool holder and in addition to allowing the force acting on the upstanding side wall to be easily increased without changing the direction of the force thereby eliminating problems of manufacturing tolerance.

What is claimed is:

1. A tool holder for use with a tool bit having a cylindrical central hole therein, comprising; (a) a shank having a cut-out portion in the forward end thereof and having a flat surface for supporting one surface of said tool bit and an upstanding sidewall for engaging a substantial portion of the side surface of said tool bit and a large bore in the forward end of said shank and located in the central portion of said flat surface; (b) a retaining pin rockingly received in one end of said bore with the head of said retaining pin projecting out of said one end of said bore, said retaining pin additionally having a generally spherical large diameter portion continguous to said head portion and a generally cylindrical small diameter stem portion depending from said large diameter portion, said large diameter portion being received in an enlarged portion of said bore, and said small diameter portion being received in a smaller diameter portion of said bore for retaining said large diameter portion of said pin in said large diameter portion of said bore, said small diameter portion of said pin having an annular groove at the bottom thereof with a retaining ring received therein for holding said pin in said shank and said small diameter portion of said pin additionally controlling the rocking movement of said pin in a rocking direction; (c) a tightening screw in said shank located in a position for urging said small diameter stem portion of said retaining pin in said rocking direction by engaging said small diameter stem portion at substantially its lower end and thereby urging said tool bit against said upstanding sidewall and holding said retaining pin within said shank.

2. A tool holder as set forth in claim 1 wherein said retaining pin is urged toward the central portion of said upstanding sidewall.

3. A tool holder as set forth in claim 1 wherein the tip of said tightening screw is shaped conically, the conical angle of said tip and the orientation of said holding screw with respect to said retaining pin receiving bore being such that the maximum force possible is achieved for urging said retaining pin in said rocking direction.

* * * * *